(12) United States Patent
Sendzik (10) Patent No.: US 10,933,475 B2
(45) Date of Patent: Mar. 2, 2021

(54) TOOL CLAMPING SYSTEM

(71) Applicant: Broetje-Automation GmbH, Rastede (DE)

(72) Inventor: Egbert Sendzik, Oldenburg (DE)

(73) Assignee: Broetje-Automation GmbH, Rastede (DE)

( * ) Notice: Subject to any disclaimer, the term of this patent is extended or adjusted under 35 U.S.C. 154(b) by 210 days.

(21) Appl. No.: 15/578,443

(22) PCT Filed: May 30, 2016

(86) PCT No.: PCT/EP2016/062176
§ 371 (c)(1),
(2) Date: Nov. 30, 2017

(87) PCT Pub. No.: WO2016/193218
PCT Pub. Date: Dec. 8, 2016

(65) Prior Publication Data
US 2018/0147639 A1    May 31, 2018

(30) Foreign Application Priority Data
May 30, 2015  (DE) ................. 20 2015 102 802.4

(51) Int. Cl.
*B23B 31/117*  (2006.01)
*B23Q 3/12*  (2006.01)
(Continued)

(52) U.S. Cl.
CPC ............ *B23B 31/117* (2013.01); *B23Q 3/12* (2013.01); *B23B 31/005* (2013.01); *B23B 31/02* (2013.01);
(Continued)

(58) Field of Classification Search
CPC ........... B23B 31/117; B23B 2231/0224; B23B 2270/06; B23Q 3/12; Y10T 279/17957; Y10T 403/7009
See application file for complete search history.

(56) References Cited

U.S. PATENT DOCUMENTS 1,975,877 A    10/1934  Thomas et al.
2,219,907 A    10/1940  Ross et al.
(Continued)

FOREIGN PATENT DOCUMENTS

DE        29921053 U1 *  1/2000  ............. B24B 45/00
DE    202006014812      12/2006
(Continued)

OTHER PUBLICATIONS

"German Search Report," for German Patent Application No. DE 202015102802.4 (priority application to U.S. Appl. No. 15/578,443) dated Mar. 30, 2016 (5 pages), no translation available.
(Continued)

*Primary Examiner* — Eric A. Gates
(74) *Attorney, Agent, or Firm* — Pauly, DeVries Smith & Deffner LLC (57) ABSTRACT

Various embodiments relate to a tool-clamping system having two metallic shaft portions, wherein the first shaft portion has a locking pin at the end and the second shaft portion has a locking sleeve at the end, wherein, in order to establish a releasable drive connection, the first shaft portion can be introduced coaxially, by way of its locking pin, into the locking sleeve of the second shaft portion and the two shaft portions can be pivoted in relation to one another, in a locking pivoting movement, about a common geometrical longitudinal axis into a locking pivot position, wherein, over the course of the locking pivoting movement, at least one latching formation arranged on the circumference of the locking pin, snap-fits or snap-fit over at least one corre- (Continued)

sponding mating latching formation of the locking sleeve, the locking pin and/or locking sleeve being elastically deformed in the process.

23 Claims, 4 Drawing Sheets

(51) Int. Cl.
  *B23Q 3/155* (2006.01)
  *B23Q 3/157* (2006.01)
  *B23B 31/02* (2006.01)
  *B23B 31/00* (2006.01)

(52) U.S. Cl.
  CPC ... *B23B 2231/0224* (2013.01); *B23B 2270/06* (2013.01); *B23Q 3/15553* (2013.01); *B23Q 3/15706* (2013.01); *Y10T 279/17957* (2015.01)

(56) References Cited

U.S. PATENT DOCUMENTS

| | | | | |
|---|---|---|---|---|
| 2,397,382 | A * | 3/1946 | Smith | F16D 1/02 |
| | | | | 403/350 |
| 3,028,770 | A | 10/1962 | Pittwood et al. | |
| 3,630,534 | A * | 12/1971 | Better | B23B 31/117 |
| | | | | 409/232 |
| 5,011,319 | A | 4/1991 | Quarberg et al. | |
| 5,667,228 | A * | 9/1997 | Fabris | B23B 31/113 |
| | | | | 279/143 |
| 5,762,344 | A * | 6/1998 | Einvall | B23D 71/04 |
| | | | | 279/96 |
| 6,276,879 | B1 | 8/2001 | Hecht | |
| 6,540,449 | B1 | 4/2003 | Bejerstaal et al. | |
| 6,619,877 | B1 | 9/2003 | Huang | |
| 6,802,328 | B2 * | 10/2004 | Lin | A47C 3/0255 |
| | | | | 135/117 |
| 7,407,337 | B2 * | 8/2008 | Tella | F16D 1/072 |
| | | | | 348/345 |
| 7,992,878 | B2 * | 8/2011 | Dace | F16D 1/116 |
| | | | | 279/102 |
| 8,360,699 | B2 * | 1/2013 | Stojanovski | B23C 5/10 |
| | | | | 279/89 |
| 8,668,413 | B2 | 3/2014 | Volokh | |
| 2010/0270756 | A1 | 10/2010 | Guy | |
| 2015/0104264 | A1 | 4/2015 | Vogel et al. | |

FOREIGN PATENT DOCUMENTS

| | | |
|---|---|---|
| EP | 1598133 | 11/2005 |
| WO | 0205992 | 1/2002 |
| WO | 2004024504 | 3/2004 |

OTHER PUBLICATIONS

"International Preliminary Report on Patentability," for PCT Application No. PCT/EP2016/062176 (priority application to U.S. Appl. No. 15/578,443) dated Dec. 14, 2017 (14 pages) with English translation.

"International Search Report and Written Opinion," for PCT Application No. PCT/EP2016/062176 (priority application to U.S. Appl. No. 15/578,443) dated Aug. 8, 2016 (18 pages) with English translation.

* cited by examiner

TOOL CLAMPING SYSTEM

CROSS-REFERENCE TO RELATED APPLICATIONS

This application is a national stage application under 35 U.S.C. 371 of International Patent Application Serial No. PCT/EP2016/062176, entitled "Werkzeugspannsystem," filed May 30, 2016, which claims priority from German Patent Application No. DE 20 2015 102 802.4, filed May 30, 2015, the disclosure of which is incorporated herein by reference.

FIELD OF THE TECHNOLOGY

The disclosure relates to a tool clamping system, also referred to as a tool-clamping system, having two metallic shaft portions, to a clamping chuck for a rotating tool and to a machine-tool unit.

BACKGROUND

Machine tools with rotating tools are usually equipped with a tool-clamping system which allows manual or automated tool changeover. For this purpose, the tool-clamping system makes it possible for two shaft portions with a common geometrical longitudinal axis to be connected in a releasable manner, wherein one of the shaft portions, depending on the application, may be a constituent part of a drive spindle of the machine tools. In the case of a known tool-clamping system (WO 02/05992 A1), the tool-clamping system connects the drive spindle of a machine tool to a clamping chuck which has a steep taper on the spindle side. The steep taper is clamped by means of a spindle-side steep-taper mount.

The above tool-clamping system, in particular the steep-taper mount, is usually equipped with a clamping mechanism which has a dedicated drive and a plurality of individual parts which rotate along with it. This complex construction of the tool-clamping system means that miniaturization is not readily possible without the concentricity and the torque transmission being impaired. Such miniaturization is required in some areas, in particular for drilling holes during the production of structural components for aircraft. Furthermore, tool-changeover automation is associated with the use of additional drives and is therefore complex in design terms.

SUMMARY

The disclosure is based on the problem of specifying an automatable tool-clamping system which allows miniaturization along with good concentricity and high torque transmission.

The above problem is solved by a tool-clamping system having the features as disclosed herein.

A snap-fit connection can be established from the very shaft portions which are to be connected. The elasticity which is present at least to a small extent in metallic shaft portions is utilized in order to realize a corresponding snap-fit action.

It has also been found that the above snap-fit action can be achieved by a locking pivoting movement of the two shaft portions in relation to one another about the common geometrical longitudinal axis. In specific terms, it is proposed that the first shaft portion of the tool-clamping system should have a locking pin at the end and the second shaft portion should have a locking sleeve at the end, wherein, in order to establish a releasable drive connection, the first shaft portion can be introduced coaxially, by way of its locking pin, into the locking sleeve of the second shaft portion. This drive connection serves to transmit rotary drive movements and drive torques.

For establishing the connection, the two shaft portions are pivoted in relation to one another, in a locking pivoting movement, about a common geometrical longitudinal axis into a locking pivot position. The pivoting results in a snap-fitting operation on account of elastic deformation of the locking pin and/or of the locking sleeve. For this purpose, at least one latching formation arranged on the circumference of the locking pin is provided and, over the course of the locking pivoting movement, said latching formation snap-fits over at least one corresponding mating latching formation of the locking sleeve. In order to realize a high level of concentricity, in one example at least three latching formations distributed over the circumference of the locking pin are provided, and, over the course of the locking pivoting movement, said latching formations snap-fit over at least three corresponding mating latching formations of the locking sleeve, the locking pin and/or locking sleeve being elastically deformed in the process.

It can be gathered from the explanation above that the solution according to the proposal can establish a connection between two metallic shaft portions without any separate clamping devices being necessary. The connection is established merely as a result of the locking pin being introduced into the locking sleeve along with a subsequent locking pivoting movement of the two shaft portions in relation to one another.

Since there is no need for any separate components for establishing the connection, the solution according to the proposal can also achieve extremely good concentricity even in the case of the clamping system being miniaturized. Even the task of transmitting high torques poses no problems, since a form fit for providing such torques is easy to realize.

Furthermore, the connection can be easily established and released in an automated manner, since all that is required for this purpose is a linear movement, specifically the introduction of the locking pin, and a pivoting movement, specifically the locking pivoting movement. It is possible to dispense with additional drives for establishing and releasing the connection.

A particularly reliable connection is achieved in various embodiments, and therefore the connection is not just a force-fitting one, but also, in respect of the shaft portions pivoting in relation to one another, a form-fitting one on either side.

An embodiment provides an unlocking pivoting region, within which the locking pin can be introduced into the locking sleeve. If the unlocking pivoting region extends over a sizable pivoting region, there is no need to ensure the precise angular position of the two shaft portions in relation to one another for introduction of the locking pin. This considerably simplifies the level of complexity for automating the operation of establishing the connection.

As an alternative, or in addition, provision may be made for the geometry of the shaft portions to assist the alignment of the two shaft portions in relation to one another into an unlocking pivot position when the locking pin is introduced. For this purpose, at least one shaft portion is provided with a corresponding introduction slope.

A further simplification for automating the operation of establishing the connection is disclosed herein, in which, when the locking pin is introduced, an amount of radial play is provided between the locking pin and the locking sleeve. As a result, the accuracy-related requirements to be met by the movement guidance during automation are not particularly significant.

Various configurations relate to designs of the locking pin and locking sleeve, as a result of which a particularly low level of wear can be expected when the connection is established and released.

Various configurations relate to ways of securing the connected shaft portions axially in relation to one another. This is advantageous in particular in applications which are subject to vibration, for example in vibration drilling.

The tool-clamping system according to the proposal can be used in quite different regions of a machine tool. In the case of some configurations, the tool-clamping system provides a connection between a rotating tool and the tool side of a clamping chuck. In the case of some configurations, in contrast, the tool-clamping system provides a connection between the spindle side of a clamping chuck and the drive spindle of a machine tool. Other use examples are conceivable.

Additional embodiments are related to a clamping chuck for a rotating tool.

The clamping chuck according to the proposal has an above spindle side for connection to a drive spindle of a machine tool and an above tool side for connection to the tool. Such a clamping chuck is often used in tool-changeover systems. A multiplicity of clamping chucks, each fitted with a tool, are provided in a tool magazine here. During tool changeover, there is an exchange of the clamping chucks, fitted with the respective tool, on the drive spindle of the machine tool. It is possible here to provide a tool-clamping system according to the proposal on the spindle side or on the tool side of the clamping chuck. Both cases provide good conditions for allowing the operation of establishing the connection between the respective shaft portions to be automated.

Additional embodiments are related to a machine-tool unit having a drive spindle and a tool drive assigned to the drive spindle.

Additional embodiments are related to a machine-tool unit that is equipped with a clamping chuck such as is disclosed herein.

As far as any advantages and possible configurations of the clamping chuck according to the proposal and of the machine-tool unit according to the proposal are concerned, reference may be made to what has been said in relation to the tool-clamping system according to the proposal.

An embodiment provides a tool-clamping system having two metallic shaft portions, wherein the first shaft portion has a locking pin at an end and the second shaft portion has a locking sleeve at an end, wherein, in order to establish a releasable drive connection, the first shaft portion can be introduced coaxially, by way of its locking pin, into the locking sleeve of the second shaft portion and the two shaft portions can be pivoted in relation to one another, in a locking pivoting movement, about a common geometrical longitudinal axis into a locking pivot position, wherein, over the course of the locking pivoting movement, at least one latching formation arranged on the circumference of the locking pin, such as at least three latching formations distributed over the circumference of the locking pin, snap-fits or snap-fit over at least one corresponding mating latching formation of the locking sleeve, such as at least three corresponding mating latching formations of the locking sleeve, the locking pin and/or locking sleeve being elastically deformed in the process.

In various embodiments, the latching formation and/or the mating latching formation are/is configured in the form of a radial formation.

In various embodiments, in the locking pivot position, a radial flow of forces which stems from the elastic deformation prevails between the locking pin and the locking sleeve.

In various embodiments, over the course of the locking pivoting movement, the two shaft portions, in particular the locking pin and the locking sleeve, form a pivoting end stop when the locking pivot position is reached, and therefore, in the locking pivot position between the locking pin and the locking sleeve, a form fit which acts in both pivoting directions prevails between the two shaft portions.

In various embodiments, over the course of the locking pivoting movement, at least one stop formation arranged on the circumference of the locking pin, such as at least three stop formations distributed over the circumference of the locking pin, comes or come into blocking engagement with at least one corresponding mating stop formation of the locking sleeve and forms or form the pivoting end stop, such as wherein the at least one stop formation and/or the at least one mating stop formation are/is, at the same time, at least one latching formation or mating latching formation.

In various embodiments, the tool-clamping system further comprises an unlocking pivot position in respect of the pivoting of the two shaft portions in relation to one another, it being possible, in said unlocking pivot position, for the first shaft portion to be introduced coaxially, by way of its locking pin, into the locking sleeve of the second shaft portion, and an unlocking pivoting region in respect of the pivoting of the two shaft portions in relation to one another, it being possible, within said unlocking pivoting region, for the first shaft portion to be introduced coaxially, by way of its locking pin, into the locking sleeve of the second shaft portion, such that the unlocking pivoting region covers an angle range of at least 25°, or an angle range of at least 40°.

In various embodiments, at least one shaft portion has an introduction slope which, when the locking pin is introduced into the locking sleeve, assists alignment of the two shaft portions in relation to one another into the unlocking pivot position.

In various embodiments, in the unlocking pivot position and/or in the unlocking pivoting region, an amount of radial play is provided between the locking pin and the locking sleeve.

In various embodiments, as seen in a cross section transverse to the common geometrical longitudinal axis, the latching formation and/or the matching latching formation form/forms a contour with a radial elevation.

In various embodiments, the contour regions on either side of the radial elevation are arranged differently in the radial direction such that at the beginning of the locking pivoting movement, in particular in an unlocking pivot position, an amount of radial play is present between the locking pin and the locking sleeve and that, in the locking pivot position, a radial flow of forces prevails between the locking pin and the locking sleeve.

In various embodiments, in respect of the common geometrical longitudinal axis, the locking pin and/or the locking sleeve are/is of rotationally symmetrical configuration at least in part, and/or wherein, as seen in a cross section transverse to the common geometrical longitudinal axis of the locking pin and/or of the locking sleeve, the contour is constant at least over an axial portion.

In various embodiments, as seen in a cross section transverse to the common geometrical longitudinal axis, the contour of the locking pin has a polygonal basic shape with an odd number of corner regions which each form a latching formation, wherein, as seen in a cross section transverse to the common geometrical longitudinal axis, the locking pin has a triangular basic shape of which the corner regions form the latching formations.

In various embodiments, when the locking pin is introduced axially into the locking sleeve, the two shaft portions form an axial end stop when an axial end-introduction position is reached, wherein, for forming the axial end stop, an annular shoulder, which is aligned with the common geometrical longitudinal axis, follows the locking pin.

In various embodiments, during the locking pivoting movement, the two shaft portions form an additional form fit with one another and, in the locking pivot position, this additional form fit blocks axial withdrawal of the first shaft portion from the second shaft portion counter to the introduction direction.

In various embodiments, one shaft portion is the shank of a rotating tool and the other shaft portion is the tool side of a clamping chuck.

In various embodiments, one shaft portion is the spindle side of a clamping chuck and the other shaft portion is the drive spindle of a machine-tool unit.

An embodiment provides a clamping chuck for a rotating tool, wherein the clamping chuck has a spindle side for connection to a drive spindle of a machine-tool unit and a tool side for connection to the tool, wherein the spindle side or the tool side forms a shaft portion of a tool-clamping system as described herein.

An embodiment provides a machine-tool unit comprising: a drive spindle and a tool drive assigned to the drive spindle, further comprising a clamping chuck as described herein.

Various embodiments further comprise a vibration generator, the vibration generator, for vibration drilling, introducing vibrations in particular in the axial direction into the drive spindle, and wherein the vibrations run via the clamping chuck.

Various embodiments further comprise a tool-changeover device, said tool-changeover device accommodating a plurality of clamping chucks fitted with tools, wherein, for tool changeover, the tool-changeover device introduces the locking pin into the locking sleeve.

In various embodiments, for tool changeover, the tool drive executes the locking pivoting movement, wherein, during the locking pivoting movement, the tool-changeover device secures one of the shaft portions of the clamping chuck in respect of pivoting about the common geometrical longitudinal axis, wherein the tool-changeover device has a tool magazine with mounts for the clamping chucks, and wherein the mounts secure the respective shaft portion.

BRIEF DESCRIPTION OF THE DRAWINGS

Various aspects will be explained in more detail hereinbelow with reference to a drawing, which illustrates just one exemplary embodiment and in which.

DETAILED DESCRIPTION

Figure 1:
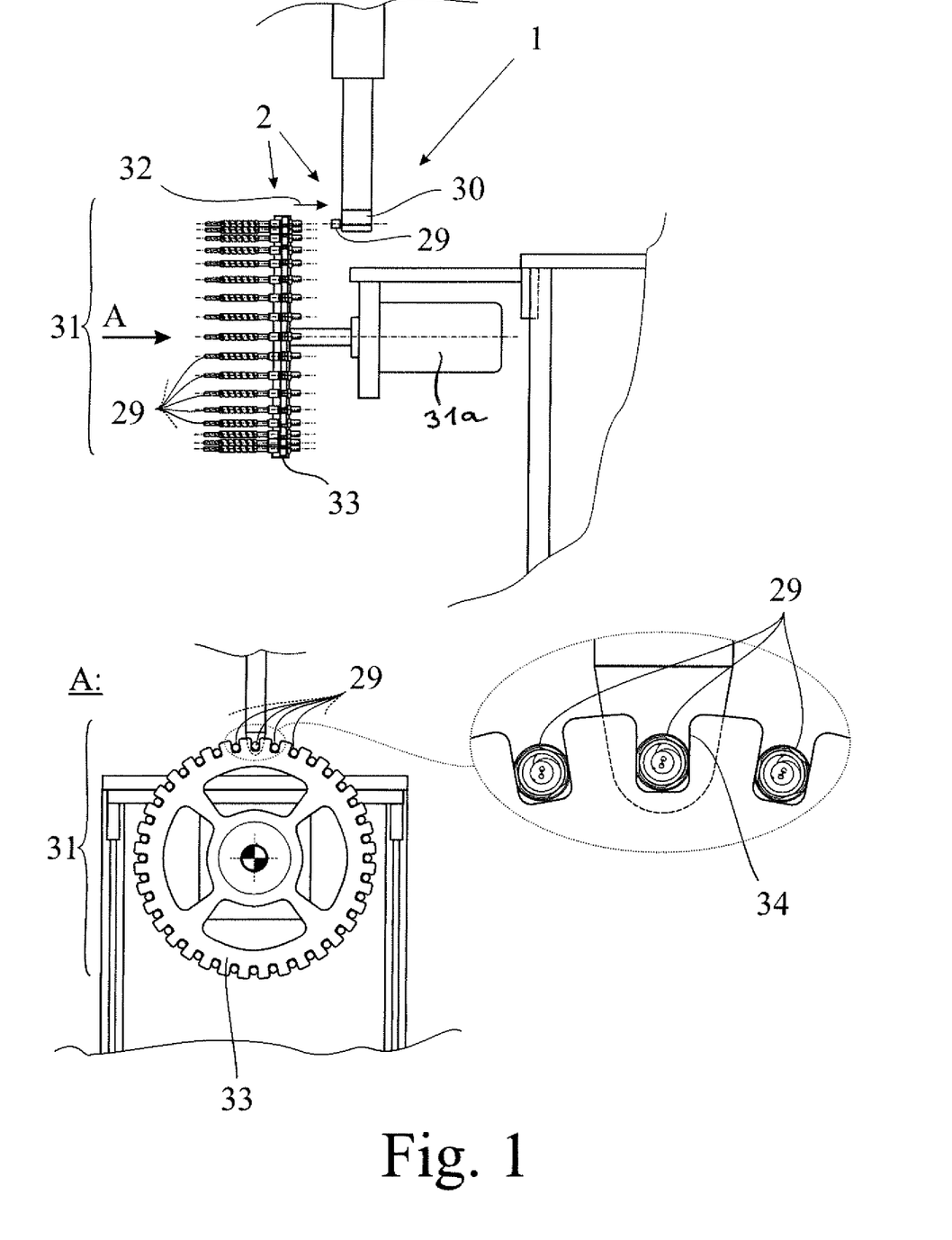
FIG. 1 shows a machine-tool unit according to the proposal having a tool-clamping system according to the proposal.

The machine tool shown in FIG. 1 is a drilling/riveting machine for producing structural components for aircraft. It is only the machine-tool unit 1, which is configured in the form of a drilling unit, which is illustrated. The machine-tool unit 1 as such will be explained in detail at a later stage in the text. First of all, this will be preceded hereinbelow by an explanation of the tool-clamping system 2 according to the proposal, which belongs to the machine-tool unit 1.

Figure 2:
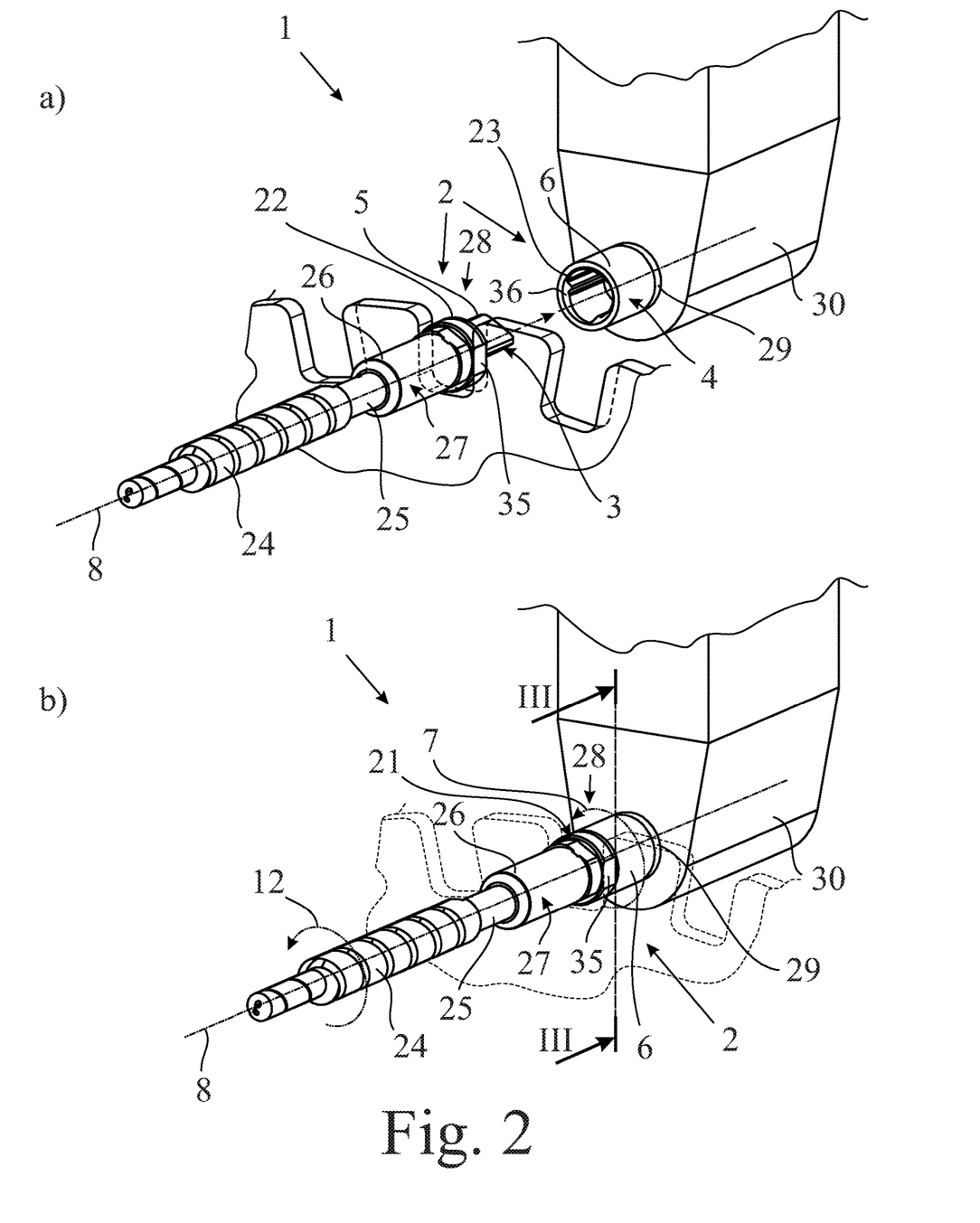
FIG. 2 shows the tool-clamping system according to the proposal a) prior to the connection between the shaft portions being established and b) after the connection between the shaft portions has been established.

The basic construction of the tool-clamping system 2 according to the proposal can best be gathered from the illustration according to FIG. 2. The tool-clamping system 2 has two metallic shaft portions 3, 4, wherein the first shaft portion 3 has a locking pin 5 at the end and the second shaft portion 4 has a locking sleeve 6 at the end. The shaft portions 3, 4 here are drive-shaft portions.

The two shaft portions 3, 4 can be configured from a steel material which provides the level of elasticity necessary for the snap-fit action according to the proposal, and yet to be explained. For a low level of wear, the shaft portions 3, 4 can be surface-treated. Provision may be made, in principle, for the two shaft portions 3, 4 to be configured from different materials.

In order to establish a releasable drive connection, the first shaft portion 3 can be introduced coaxially, by way of its locking pin 5, into the locking sleeve 6 of the second shaft portion 4, as can be gathered from the changeover between FIG. 2a and FIG. 2b. For completion of the drive connection, provision is made for the two shaft portions 3, 4 to be capable of being pivoted in relation to one another, in a locking pivoting movement 7, about a common geometrical longitudinal axis 8 into a locking pivot position. In the case of the exemplary embodiment which is illustrated in FIG. 2, the locking pivoting movement 7 is generated by corresponding pivoting of the locking sleeve 6 in FIG. 2b.

According to the depicted embodiment, over the course of the locking pivoting movement 7, at least three latching formations 9a-c distributed over the circumference of the locking pin 5 snap-fit over corresponding mating latching formations 10a-c of the locking sleeve 6, the locking pin 5 and/or the locking sleeve 6 being elastically deformed in the process. In respect of good concentricity, the latching formations 9a-c are distributed uniformly over the circumference of the locking pin 5. Here the elastic deformation is primarily deformation of the locking sleeve 6. The snap-fit operation over the mating latching formations 10a, 10b, 10c can be gathered from the changeover between FIG. 3a and FIG. 3b. It is sufficient in principle, according to the proposal, for at least one latching formation 9a-c and at least one mating latching formation 10a-c to be provided. All that has been said in relation to the at least three latching formations 9a-c and mating latching formations 10a-c applies correspondingly to this example.

It should be pointed out that all the details here which relate to an axis of rotation, for example radial(ly), axial(ly), coaxial(ly) or the like, are always related to the geometrical longitudinal axis 8 of the two shaft portions 3, 4, said axis being common to the two shaft portions when the latter are in the connected state.

Figure 4:
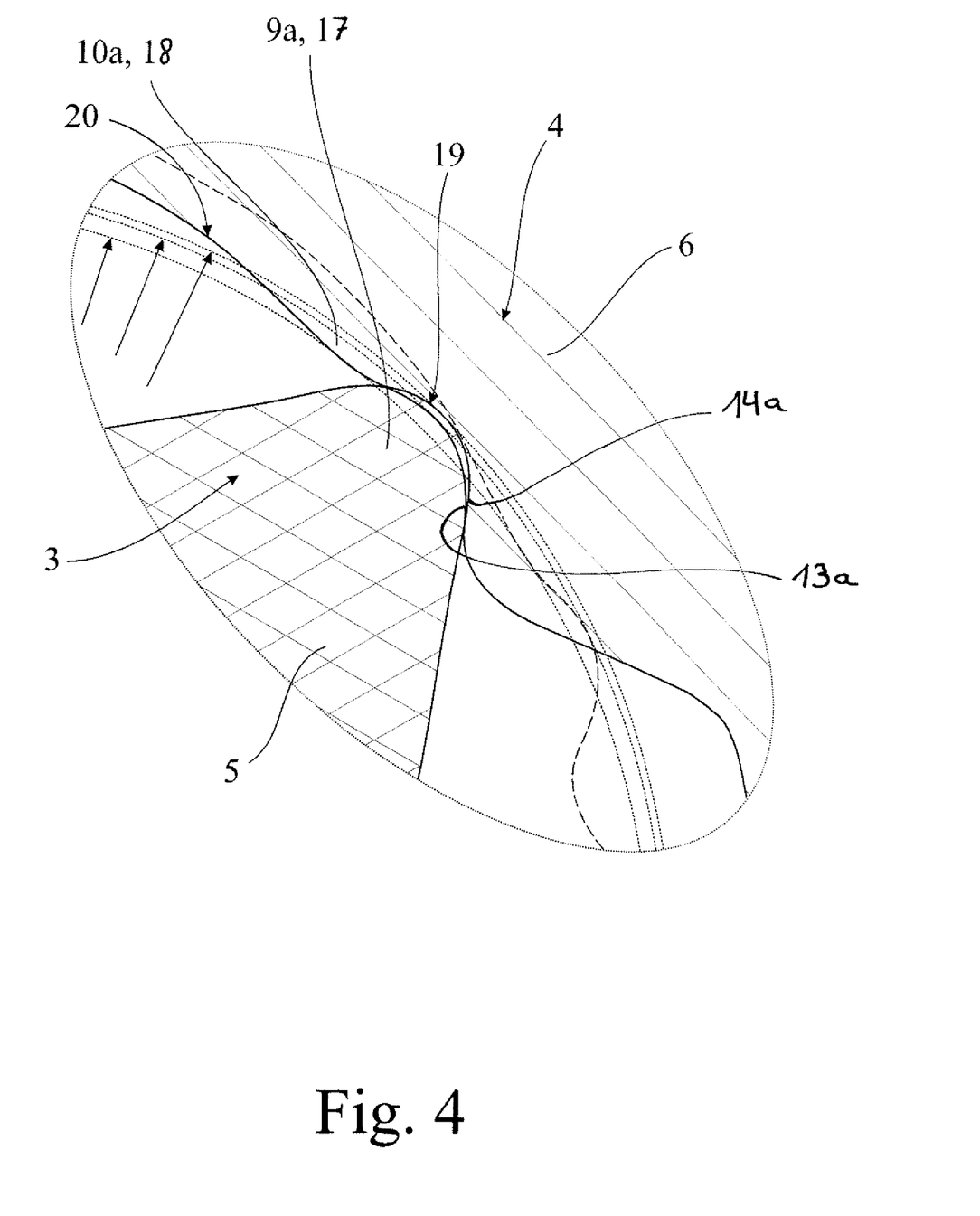
FIG. 4 shows the detail view IV of the tool-clamping system according to FIG. 3.

In the case of the exemplary embodiment which is illustrated, both the latching formation 9a-9c and the matching latching formation 10a-10c are constituted in each case by a radial formation, which correspondingly extends in the radial direction in relation to the longitudinal axis 8. This means that the respective formation extends inward or outward in the radial direction in relation to the longitudinal axis 8. FIG. 4 shows that the latching formations 9a-9c of the locking pin 5 extend radially outward, whereas the mating latching formations 10a-10c of the locking sleeve 6 extend radially inward. This may also be the other way round.

Particularly good concentricity can be realized, in the case of the exemplary embodiment illustrated, in that, in the locking pivot position (FIG. 3b), a radial flow of forces which stems from the elastic deformation prevails between the locking pin 5 and locking sleeve 6. This flow of forces runs over the latching formations 9a-9c and the mating latching formations 10a-10c, as is indicated in FIG. 3b by the force vectors $F_1$, $F_2$ and $F_3$.

A look at FIGS. 3b and 4 together shows that, in this embodiment, over the course of the locking pivoting movement 7, the two shaft portions 3, 4, the locking pin 5 and the locking sleeve 6 form a pivoting end stop 11a-c when the locking pivot position is reached. The pivoting end stop 11a-c is divided up here over the three latching formations 9a-9c, as is yet to be explained. As a result, in the locking pivot position between the locking pin 5 and the locking sleeve 6, a form fit which acts in both pivoting directions prevails between the two shaft portions 3, 4. The pivoting end stop 11a-c is designed such that it provides for torque support in relation to a drive torque in the drive direction 12. It is assumed here that the drive direction 12, as is conventional in drilling tools, is always identical.

For producing the above pivoting end stop 11a-c, over the course of the locking pivoting movement 7, in this embodiment, at least three stop formations 13a-c distributed over the circumference of the locking pin 5 come into blocking engagement with corresponding mating stop formations 14a-c of the locking sleeve 6. A particularly compact configuration is achieved by the stop formations 13a-c and/or the mating stop formations 14a-c being, at the same time, the aforementioned latching formations 9a-c or mating latching formations 10a-c. It is sufficient in principle, according to the proposal, for at least one stop formation 13a-c and at least one mating stop formation 14a-c to be provided. All that has been said in relation to the at least three stop formations 13a-c and mating stop formations 14a-c applies correspondingly to this example.

Figure 3:
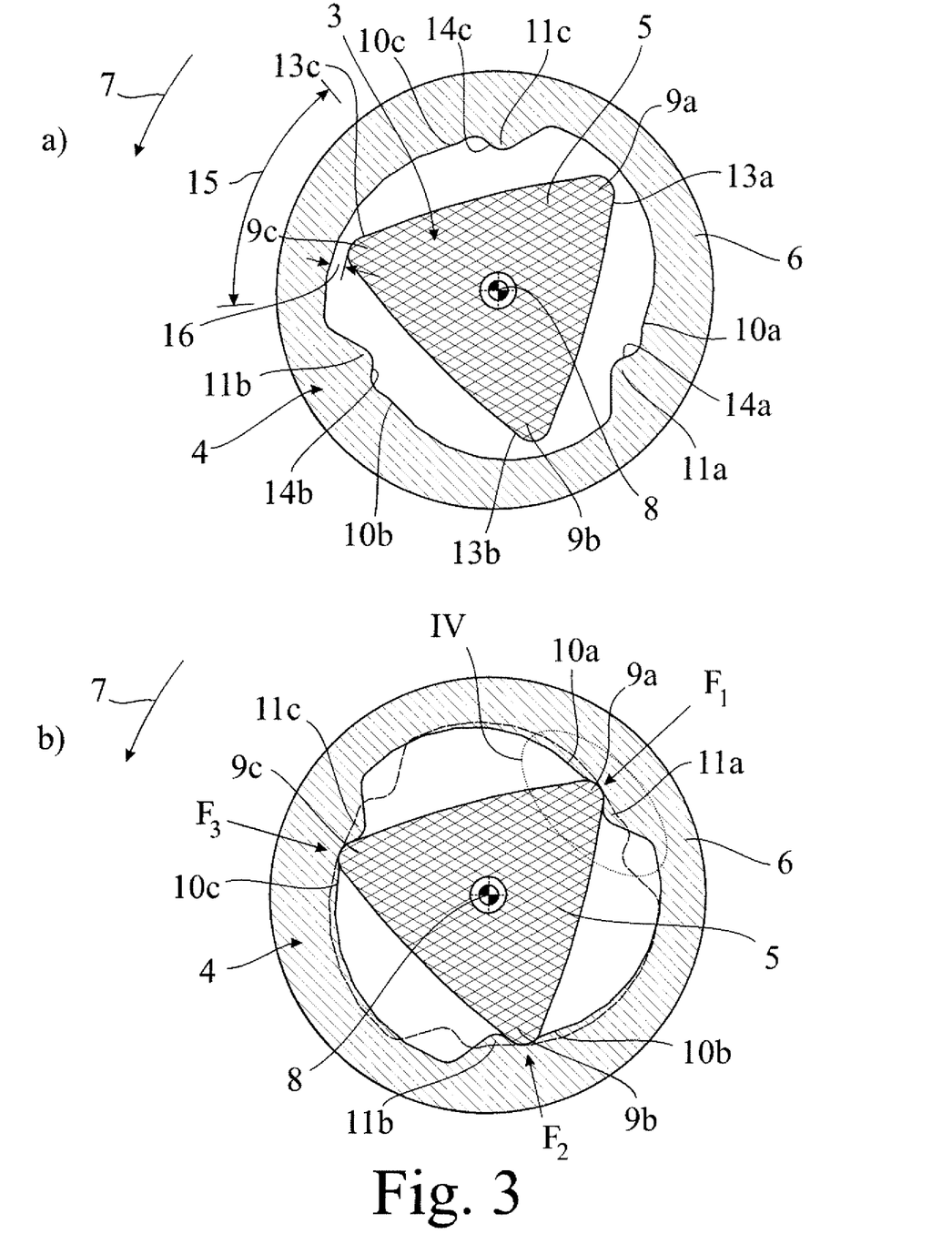
FIG. 3 shows the tool-clamping system according to FIG. 2 in a cross section taken along sectional line III-III a) in an unlocking pivot position and b) in the locking pivot position.

FIG. 3 shows that an unlocking pivot position is provided in respect of the pivoting of the two shaft portions 3, 4 in relation to one another, it being possible, in said unlocking pivot position, for the first shaft portion 3 to be introduced coaxially, by way of its locking pin 5, into the locking sleeve 6 of the second shaft portion 4. It is even the case here that an entire unlocking pivoting region 15 is provided in respect of the pivoting of the two shaft portions 3, 4 in relation to one another, it being possible, within said unlocking pivoting region, for the first shaft portion 3 to be introduced coaxially, by way of its locking pin 5, into the locking sleeve 6 of the second shaft portion 4. In an embodiment, the unlocking pivoting region 15 covers an angle range of at least 25°, and in some cases an angle range of at least 40°. This means that, when the first shaft portion 3 is introduced into the second shaft portion 4, there is no need to maintain a precise angular position of the two shaft portions 3, 4 in relation to one another, and this simplifies the operation of establishing the connection between the two shaft portions 3, 4 in an automated manner.

As an alternative, or in addition, provision may be made for at least one shaft portion 3, 4 to have an introduction slope 36 which, when the locking pin 5 is introduced into the locking sleeve 6, assists pivoting alignment of the two shaft portions 3, 4 in relation to one another into the unlocking pivot position. For this case, the unlocking pivoting region 15 may be short, since the pivoting alignment of the two shaft portions 3, 4 takes place automatically. FIG. 3a shows that, in the unlocking pivot position, here over the entire unlocking pivoting region 15, an amount of radial play 16 is provided between the locking pin 5 and the locking sleeve 6. This radial play 16 means that, when the first shaft portion 3 is introduced into the second shaft portion 4, there is not necessarily any need to ensure the positioning of the two shaft portions 3, 4, in particular the coaxiality of the two shaft portions 3, 4, and this further simplifies the operation of establishing the connection in an automated manner.

The shaping of the latching formation 9a-c and mating latching formation 10a-c can be particularly important for some embodiments. It is the case here as seen in a cross section transverse to the common geometrical longitudinal axis 8, that the latching formation 9a-c forms a contour with a radial elevation 17, as is shown in FIG. 4. FIG. 4 also shows that, as seen in a cross section transverse to the common geometrical longitudinal axis 8, the mating latching formation 10a-c forms a contour with a radial elevation 18. It is also possible, in principle, for this to be provided just for one of the two formations mentioned. It is the case here that the elevation 17 of the latching formation 9a-c and/or the elevation 18 of the mating latching formation 10a-c form/forms in each case a constant, in particular rounded, curve, this resulting in uniform loading of the shaft portions 3, 4 during the snap-fit operation.

An interesting point in respect of the radial elevation 18 of the mating latching formation 10a-c is the fact that the contour regions 19, 20 on either side of the radial elevation 18 are arranged differently in the radial direction such that at the beginning of the locking pivoting movement 7, here in an aforementioned unlocking pivot position, a likewise already mentioned amount of radial play 16 is present between the locking pin 5 and the locking sleeve 6 (FIG. 3a), whereas, in the locking pivot position, a radial flow of forces prevails between the locking pin 5 and the locking sleeve 6 (FIG. 3b). As a result, following the snap-fit operation according to the proposal, the abovementioned radial flow of forces remains between the locking pin 5 and the locking sleeve 6.

FIG. 3 shows that, in respect of the common longitudinal axis 8, the locking pin 5 and the locking sleeve 6 are of rotationally symmetrical design at least in part. This may also be the case for just one of these two components. The rotational symmetry illustrated gives rise to particularly high concentricity.

It is also the case with the exemplary embodiment which is illustrated, as seen in a cross section transverse to the common geometrical longitudinal axis 8 of the locking pin 5 and/or of the locking sleeve 6, the contour is constant at least over an axial portion. In order to guarantee, over this axial portion, as constant a level of compliance as possible for the locking sleeve 6, in order to provide for the abovementioned elastic deformation, it may be necessary for the locking sleeve 6 to be provided with specific weakenings, in particular with slits (not illustrated).

A configuration which is particularly stable in mechanical terms and particularly advantageous in respect of the resulting concentricity consists in that, as seen in a cross section transverse to the common geometrical longitudinal axis 8, the contour of the locking pin 5 has a polygonal basic shape with an odd number of corner regions, wherein the corner regions each form a latching formation 9*a-c*. It is the case here, as seen in a cross section transverse to the common geometrical longitudinal axis 8, the locking pin 5 has a triangular basic shape, of which the corner regions form the latching formations 9*a-c*.

In particular for drilling, a defined axial length of the shaft portions 3, 4 in relation to one another can be particularly important for some embodiments. Accordingly, provision is made in the case of the exemplary embodiment which is illustrated, so that, when the locking pin 5 is introduced axially into the locking sleeve 6, the two shaft portions 3, 4 form an axial end stop 21 when an axial end-introduction position is reached. It is the case here for forming the axial end stop 21, an annular shoulder 22, which is aligned with the common geometrical longitudinal axis 8, follows the locking pin 5 and, when the locking pin 5 is introduced axially, comes into blocking abutment with an end surface 23 of the locking sleeve 6.

In a variant which is not illustrated here, provision is also made so that, during the locking pivoting movement 7, the two shaft portions 3, 4 form an additional form fit with one another and, in the locking pivot position, this additional form fit blocks axial withdrawal of the first shaft portion 3 from the second shaft portion 4 counter to the introduction direction. This additional form fit may be provided, for example, in the manner of a bayonet closure.

Further variants are conceivable, as indicated above, for the use of the tool-clamping system 2 according to the proposal. The tool-clamping system can be used, in principle, to clamp in place a rotating tool 24, in this example, to clamp in place a drilling tool. It is then the case that one shaft portion is the shank 25 of the rotating tool 24 and the other shaft portion is the tool side 26 of a clamping chuck 27.

However, it is the case here that one shaft portion 3 is the spindle side 28 of the clamping chuck 27 shown in FIG. 2 and the other shaft portion 4 is the drive spindle 29 of a machine-tool unit 1.

A further teaching is related to the very clamping chuck 27 for a rotating tool 24. The clamping chuck 27 here has a spindle side 28 for connection to a drive spindle 29 of a machine-tool unit 1 and a tool side 26 for connection to the tool 24, in this case for connection to the drilling tool. Accordingly, it is the case that the spindle side 28 or the tool side 26 form a shaft portion 3, 4 of a tool-clamping system 2 according to the proposal. As far as the clamping chuck 27 is concerned, the tool-clamping system 2 according to the proposal serves here for connecting the clamping chuck 27 to the drive spindle 29 of the machine-tool unit 1.

Various embodiments relate to a machine-tool unit 1 having a drive spindle 29 and a tool drive 30 assigned to the drive spindle 29, wherein the drive spindle 29 is assigned a clamping chuck 27 according to the proposal. It is the case here, once again that the tool-clamping system 2 according to the proposal serves for connecting the clamping chuck 27 to the drive spindle 29 of the machine-tool unit 1.

The tool-clamping system 2 according to the proposal can be used particularly advantageously in vibration drilling, since the connection which can be established by the tool-clamping system 2 according to the proposal is particularly reliable, in particular particularly resistant to vibration. Accordingly, the machine-tool unit 1, for vibration drilling, can readily introduce vibrations, in particular in the axial direction into the drive spindle 29, wherein the vibrations also run at any rate via the clamping chuck 27.

As mentioned above, the connection which can be established by the tool-clamping system 2 according to the proposal can be established and released again to particularly good effect in an automated manner. FIGS. 1 and 2 show an embodiment for this purpose. Also provided is a tool-changeover device 31, said device accommodating a plurality of clamping chucks 27 fitted with tools 24. The tool-changeover device 31 can be adjusted as such by a motor along the longitudinal axis 8 by means of a tool-changeover drive 31*a*, and therefore, for tool changeover, the tool-changeover device 31 introduces the locking pin 5 into the locking sleeve 6. This introduction movement is indicated in FIG. 1 by the reference sign 32.

A particularly interesting point in respect of the machine-tool unit 1 illustrated in FIGS. 1 and 2, however, is the fact that, for tool changeover, the tool drive 30 executes the locking pivoting movement 7. This is achieved in that the tool drive 30 executes a corresponding pivoting movement of the drive spindle 29 and thus of the locking sleeve 6. At the same time, the tool-changeover device 31 secures one of the shaft portions 3, 4 of the clamping chuck 27, in this case the first shaft portion 3, in respect of pivoting about the common geometrical longitudinal axis 8. This is realized here in that the tool-changeover device 31 has a tool magazine 33 with mounts 34 for the clamping chuck 27, wherein the mounts 34 secure the respective shaft portion 3. In specific terms, this is realized in that the mounts 34 each engage in a form-fitting and rotationally fixed manner with the clamping chucks 27. For this purpose, the clamping chucks 27 each have flattened portions 35 which, correspondingly, engage in a rotationally fixed manner with the mounts 34. The tool magazine 33 can be pivoted or rotated in the customary manner by a motor, in particular by the tool-changeover drive 31*a*, in order for the tool 24 which is to be changed over in each case to be positioned in front of the drive spindle 29, in particular coaxially in relation to the drive spindle 29. The operation of releasing a connection established by the tool-clamping system 2 according to the proposal can be realized in reverse order. In addition, there are other design solutions conceivable for executing tool changeover in an automated manner.

The invention claimed is:

1. A tool-clamping system comprising:
   two metallic shaft portions, wherein the first shaft portion has a locking pin at an end and the second shaft portion has a locking sleeve at an end, wherein, in order to establish a releasable drive connection, the first shaft portion can be introduced coaxially, by way of its locking pin, into the locking sleeve of the second shaft portion and the two shaft portions can be pivoted in relation to one another, in a locking pivoting movement, about a common geometrical longitudinal axis into a locking pivot position, wherein, over the course of the locking pivoting movement, at least one latching formation arranged on the circumference of the locking pin, snap-fits over at least one corresponding mating latching formation of the locking sleeve, the locking pin and/or locking sleeve being elastically deformed in the process, wherein the tool clamping system is devoid of additional clamping components.

2. The tool-clamping system as claimed in claim 1, wherein the latching formation and/or the mating latching formation are/is configured in the form of a radial formation.

3. The tool-clamping system as claimed in claim 1, wherein, in the locking pivot position, a radial flow of forces which stems from the elastic deformation prevails between the locking pin and the locking sleeve.

4. The tool-clamping system as claimed in claim 1, wherein, over the course of the locking pivoting movement, the two shaft portions form a pivoting end stop when the locking pivot position is reached, and therefore, in the locking pivot position between the locking pin and the locking sleeve, a form fit which acts in at least two pivoting directions prevails between the two shaft portions.

5. The tool-clamping system as claimed in claim 4, wherein, over the course of the locking pivoting movement, at least one stop formation arranged on the circumference of the locking pin, comes into blocking engagement with at least one corresponding mating stop formation of the locking sleeve and forms the pivoting end stop.

6. The tool-clamping system of claim 5, wherein the at least one stop formation is one of at least three stop formations distributed over the circumference of the locking pin, and wherein the at least one corresponding mating stop formation is one of at least three corresponding mating stop formations of the locking sleeve.

7. The tool-clamping system as claimed in claim 1, further comprising:
   an unlocking pivot position in respect of the pivoting of the two shaft portions in relation to one another, it being possible, in said unlocking pivot position, for the first shaft portion to be introduced coaxially, by way of its locking pin, into the locking sleeve of the second shaft portion, and
   an unlocking pivoting region in respect of the pivoting of the two shaft portions in relation to one another, it being possible, within said unlocking pivoting region, for the first shaft portion to be introduced coaxially, by way of its locking pin, into the locking sleeve of the second shaft portion.

8. The tool-clamping system as claimed in claim 7, wherein at least one shaft portion has an introduction slope which, when the locking pin is introduced into the locking sleeve, assists alignment of the two shaft portions in relation to one another into the unlocking pivot position.

9. The tool-clamping system as claimed in claim 7, wherein, in the unlocking pivot position and/or in the unlocking pivoting region, an amount of radial play is provided between the locking pin and the locking sleeve.

10. The tool-clamping system as claimed in claim 1, wherein, as seen in a cross section transverse to the common geometrical longitudinal axis, the latching formation and/or the mating latching formation form/forms a contour with a radial elevation.

11. The tool-clamping system as claimed in claim 10, wherein contour regions on either side of the radial elevation are arranged differently in the radial direction such that at the beginning of the locking pivoting movement, in an unlocking pivot position, an amount of radial play is present between the locking pin and the locking sleeve and wherein in the locking pivot position, a radial flow of forces prevails between the locking pin and the locking sleeve.

12. The tool-clamping system as claimed in claim 1, wherein, in respect of the common geometrical longitudinal axis, the locking pin and/or the locking sleeve are/is of rotationally symmetrical configuration at least in part, and/or wherein, as seen in a cross section transverse to the common geometrical longitudinal axis of the locking pin and/or of the locking sleeve, a contour is constant at least over an axial portion.

13. The tool-clamping system as claimed in claim 1, wherein, as seen in a cross section transverse to the common geometrical longitudinal axis, a contour of the locking pin has a polygonal basic shape with an odd number of corner regions which each form a latching formation, wherein, as seen in a cross section transverse to the common geometrical longitudinal axis, the locking pin has a triangular basic shape of which the corner regions form the latching formations.

14. The tool-clamping system as claimed in claim 1, wherein, when the locking pin is introduced axially into the locking sleeve, the two shaft portions form an axial end stop when an axial end-introduction position is reached, wherein, for forming the axial end stop, an annular shoulder, which is aligned with the common geometrical longitudinal axis, follows the locking pin.

15. The tool-clamping system as claimed in claim 1, wherein, during the locking pivoting movement, the two shaft portions form an additional form fit with one another and, in the locking pivot position, this additional form fit blocks axial withdrawal of the first shaft portion from the second shaft portion counter to the introduction direction.

16. The tool-clamping system as claimed in claim 1, wherein one shaft portion is a shank of a rotating tool and the other shaft portion is a tool side of a clamping chuck.

17. The tool-clamping system as claimed in claim 1, wherein one shaft portion is the spindle side of a clamping chuck and the other shaft portion is the drive spindle of a machine-tool unit.

18. A clamping chuck for a rotating tool, wherein the clamping chuck has a spindle side for connection to a drive spindle of a machine-tool unit and a tool side for connection to the tool, wherein the spindle side or the tool side forms the shaft portion of the tool-clamping system as claimed in claim 1.

19. A machine-tool unit comprising: a drive spindle and a tool drive assigned to the drive spindle, further comprising a clamping chuck as claimed in claim 18.

20. The machine-tool unit as claimed in claim 19, further comprising a vibration generator, the vibration generator, for vibration drilling, introducing vibrations in particular in the axial direction into the drive spindle, and wherein the vibrations run via the clamping chuck.

21. The machine-tool unit as claimed in claim 20, further comprising a tool-changeover device, said tool-changeover device accommodating a plurality of clamping chucks fitted with tools, wherein, for tool changeover, the tool-changeover device introduces the locking pin into the locking sleeve.

22. The machine-tool unit as claimed in claim 20, wherein, for tool changeover, the tool drive executes the locking pivoting movement, wherein, during the locking pivoting movement, the tool-changeover device secures one of the shaft portions of the clamping chuck in respect of pivoting about the common geometrical longitudinal axis, wherein the tool-changeover device has a tool magazine with mounts for the clamping chucks, and wherein the mounts secure the respective shaft portion.

23. The tool-clamping system of claim 1, wherein the at least one latching formation is one of at least three latching formations distributed over the circumference of the locking pin, and wherein the at least one corresponding mating latching formation is one of at least three corresponding mating latching formations of the locking sleeve.

* * * * *